W. HELLER.
WHEEL TRUING DEVICE.
APPLICATION FILED OCT. 11, 1912.
1,073,042.　　　　　　　　　　　　　　Patented Sept. 9, 1913.
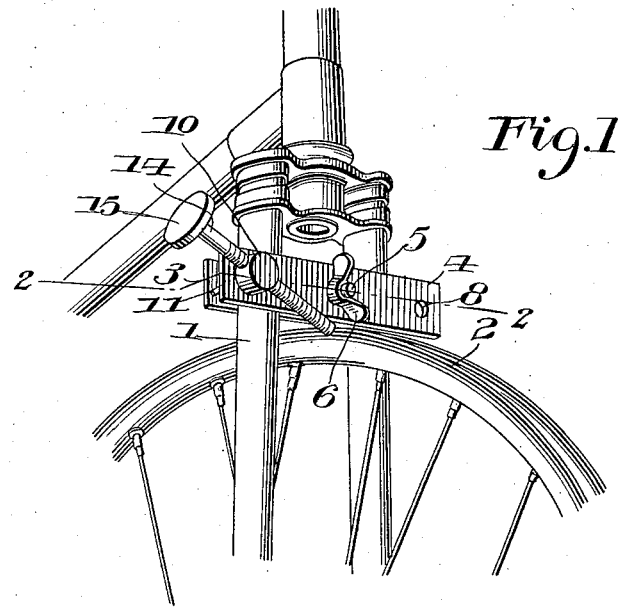
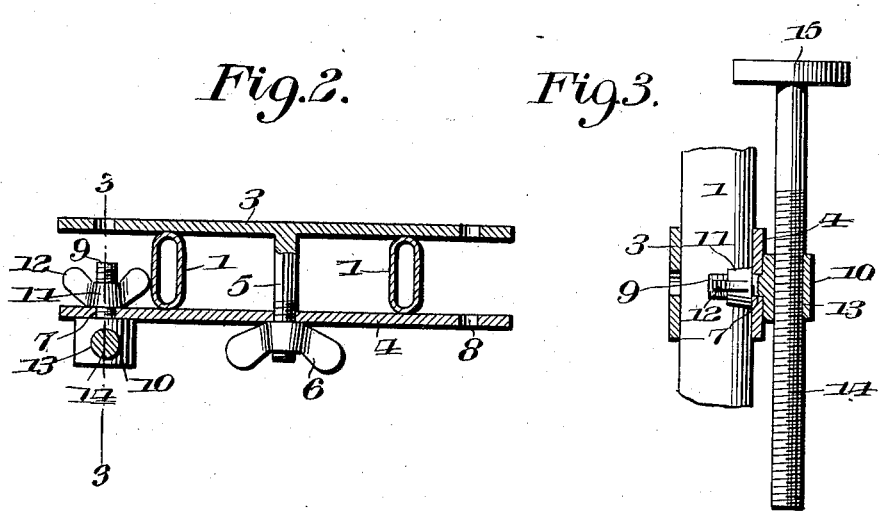
Witnesses
Inventor
William Heller
By Victor J. Evans
Attorney

UNITED STATES PATENT OFFICE.

WILLIAM HELLER, OF WESTPHALIA, KANSAS.

WHEEL-TRUING DEVICE.

1,073,042. Specification of Letters Patent. Patented Sept. 9, 1913.

Application filed October 11, 1912. Serial No. 725,259.

*To all whom it may concern:*

Be it known that I, WILLIAM HELLER, a citizen of the United States, residing at Westphalia, in the county of Anderson and State of Kansas, have invented new and useful Improvements in Wheel-Truing Devices, of which the following is a specification.

The present invention relates to truing or centering devices for the wheels of bicycles, motorcycles, etc., and the improvement resides in the construction, combination, and operative arrangement of parts set forth in the following description, and falling within the scope of the appended claim.

In the drawing, Figure 1 is a perspective view of my improvement showing the same in proper position upon the forks of a bicycle frame, to center or "true" the wheel of the bicycle. Fig. 2 is a central longitudinal sectional view taken approximately upon the line 2—2 of Fig. 1. Fig. 3 is a sectional view upon the line 3—3 of Fig. 2.

In carrying out my invention it is my primary object to provide a wheel truing device that shall be extremely simple, easily and securely retained upon the forks or frame of a vehicle, and which shall be provided with a rotatable, as well as a longitudinally adjustable truing element which may be attached to either side of the device, and which may be adjusted at a desired angle to contact with one of the peripheral faces of the rim of the wheel to properly center the wheel.

In the showing of the drawings I have illustrated the device in applied position upon the front forks of a bicycle frame, the said forks being indicated by the numerals 1, and the numeral 2 designates the rim of the wheel which is journaled between the forks.

My improvement comprises essentially a body portion constructed of a pair of spaced flat plates 3 and 4. The plate 3 is centrally provided with a threaded member 5 which extends through a central opening in the plate 4, and the said threaded member is engaged by a thumb nut 6, whereby the plates may be tightly clamped against the opposite faces or edges of the forks 1. The plate 4, is formed adjacent its opposite ends with suitable rounded openings 7 and 8, and arranged within each or within either of the said openings is the threaded stem 9 of a headed member 10.

The numeral 11 designates a nut which is provided with a handle 12, the said nut engaging with the threaded shank 9, and the handle assists in revolving the nut upon the shank. The nut 11 is adapted to frictionally contact with the inner face of the plate 4, to retain the headed member 10 tightly against the outer face of the said plate. The head 10 is provided with a transversely arranged opening 13, within which is received the threaded shank portion 14 of a headed centering or truing member 15. The openings 7 and 8 are both circular, as is the threaded shank of the headed member 10, and it will be noted that by releasing the nut 12 the headed member 10 may be rotated to sustain its opening 13, and the threaded member arranged therein at any desired angle with relation to the forks 1; and whereby the member 15 may be adjusted and retained in a desired position with relation to the rim 2 to properly center the same.

From the foregoing description, taken in connection with the accompanying drawing, the simplicity of the device, as well as the advantages and method of operation, will, it is thought be perfectly apparent to those skilled in the art to which such inventions appertain without further detailed description.

Having thus described the invention, what I claim is:—

In a wheel truing device, two plates, adjustable means for sustaining the plates in spaced relation with each other, each of the plates having round openings arranged adjacent its opposite ends, a member comprising a head and a threaded shank which is adapted to pass through one of the openings, a wing nut engaging the shank and pressing the head of the member against the plate, the head of said member being provided with a transversely arranged threaded opening, and a headed screw engaging the opening co-acting with the threaded opening of said headed member and whereby the screw is correlatively associated with the said headed member.

In testimony whereof I affix my signature in presence of two witnesses.

WILLIAM HELLER.

Witnesses:
 L. T. MARSH,
 O. E. G. OLMSTED.

Copies of this patent may be obtained for five cents each, by addressing the "Commissioner of Patents, Washington, D. C."